United States Patent

[11] 3,634,761

[72] Inventor Christopher C. Day
Newtonville, Mass.
[21] Appl. No. 825,772
[22] Filed May 19, 1969
[45] Patented Jan. 11, 1972
[73] Assignee American Optical Corporation
Southbridge, Mass.

[54] NONLINEAR RATE-MEASURING INSTRUMENT
18 Claims, 5 Drawing Figs.

[52] U.S. Cl. .................................................. 324/78 E,
324/132
[51] Int. Cl. ....................................... G01r 23/02,
G01r 15/10
[50] Field of Search ............................ 324/78 E,
78 I, 132; 307/233, 273; 328/140

[56] References Cited
UNITED STATES PATENTS
3,304,439 2/1967 Stratton et al. ............... 307/273 X
2,956,227 10/1960 Pierson ....................... 324/78 E
3,175,152 3/1965 Shafer ......................... 324/78 E
FOREIGN PATENTS
1,259,106 1/1968 Germany ..................... 324/78 E
OTHER REFERENCES
Hurel et al., IBM. Tech. Dis. Bul., pp. 489 and 490; Oct. 1968.

Primary Examiner—Alfred E. Smith
Attorneys—William C. Nealon, Noble S. Williams and Robert J. Bird ABSTRACT: A nonlinear rate-measuring instrument. A multivibrator controls the generation of fixed-amplitude current pulses at a rate equal to that of an input signal whose rate is to be measured. The pulses are averaged and the output voltage is a function of the input rate. This generally linear type of operation is made nonlinear by using the output voltage to control the period of the multivibrator, i.e., the width of each generated current pulse. High-scale or low-scale compression can be achieved depending on whether the output signal is used to decrease or increase the multivibrator period.

PATENTED JAN 11 1972
3,634,761
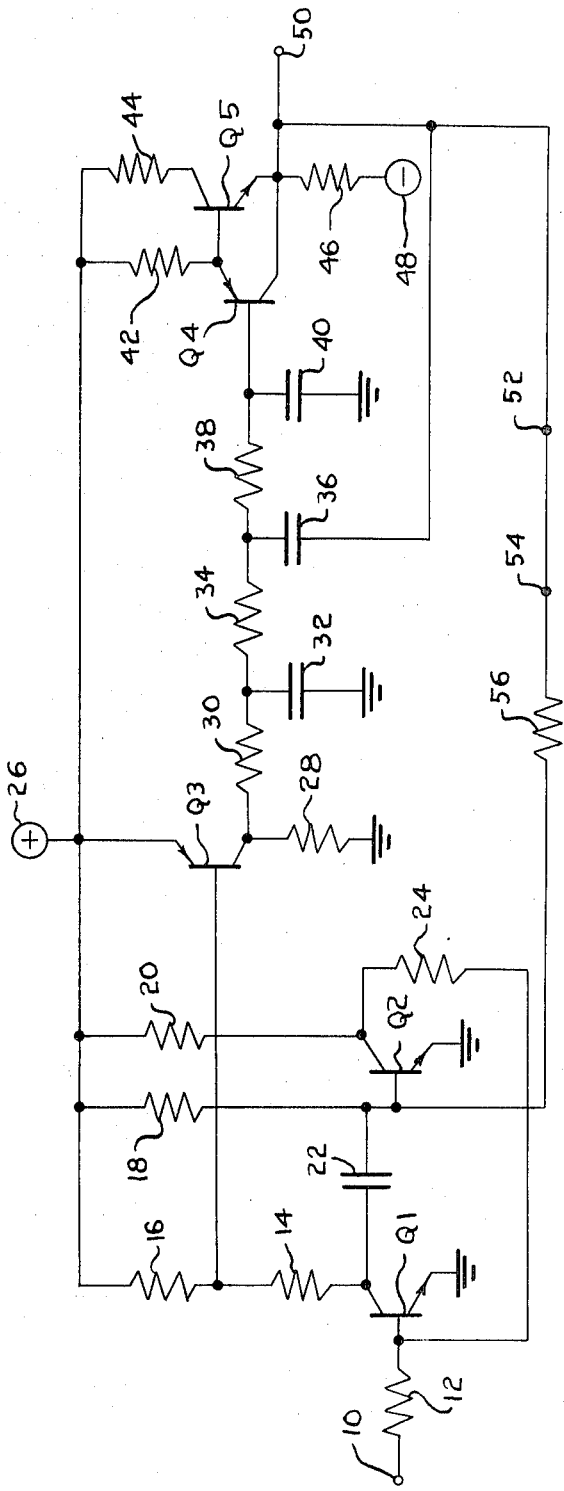
INVENTOR.
CHRISTOPHER C. DAY
BY William C. Nealon
ATTORNEY

NONLINEAR RATE-MEASURING INSTRUMENT

This invention relates to rate-measuring instruments and more particularly to rate meters which provide an output signal which is a nonlinear function of the rate of the input signal.

There are many types of rate meters. Typically, such a meter is provided with a scale and a needle indicator, the needle position on the scale representing the rate of a repetitive signal applied to the meter input. There are many situations in which rate meters are used for which a nonlinear meter transfer characteristic is highly desirable. For example, rate meters are often employed for continuous monitoring of the heartbeat rate of a cardiac patient. The meter scale may provide readings from 0 to 300 beats per minute. However, the precise value of a very high heartbeat rate, it is enough to verify that the rate is dangerous. It is for the lower rates that precise values are generally desired. In a typical nonlinear cardiac rate meter, the center of the scale might represent a rate of 100 beats per minute, while the one-fourth and three-fourths points on the scale might represent respective rates of 40 and 200. With such a scale (and corresponding meter transfer characteristic), the higher the rate the greater the scale compression. Thus, increased resolution is obtained for the lower rates where it is needed.

There are many types of linear rate meters in present day use. One such type, and that to which the present invention pertains, includes three basic components. The input signal (generally a series of short pulses derived from the repetitive input signal) is applied to the trigger input of a monostable multivibrator or some other type of pulser. For each input pulse, a fixed-width, fixed-amplitude current pulse is generated. The current pulses are extended to the second component of the instrument, an averaging circuit, typically an integrator. The voltage developed by the integrator is proportional to the average rate of the current pulses, that is, the voltage developed by the integrator is proportional to the input rate. The integrator output is connected to the third component, an output device, typically a meter mechanism for obtaining a visual signal. (Of course, instead of a meter mechanism, other output devices or logging equipment may be used.)

It is an object of my invention to provide a rate meter conceptually similar to the prior art-type rate meter just described, but which has a nonlinear transfer characteristic.

It is a more specific object of my invention to provide such a nonlinear transfer characteristic with the use of a minimum number of circuit elements so as to permit the conversion of linear rate meters of the type described to nonlinear rate meters in a very simple manner.

In accordance with the principles of my invention, a nonlinear operation is achieved by providing a feedback path from the output of the instrument (typically, from that point connected to the input of the meter mechanism) to the pulser component of the instrument. The output signal is used to change the width of each pulse generated by the monostable multivibrator or other type of pulser which may be employed. Consider the case in which the feedback is "negative," that is, the pulse width decreases with an increasing output signal. As the input rate increases and the output signal similarly increases, the increased output signal decreases the width of each generated pulse. Since the output signal is proportional to the average rate and area of the pulses, the output signal does not increase as much as it ordinarily would for the increased input rate because of the decreased area (width) of each pulse. In effect, the output signal tends to reduce its own magnitude, and this effect increases as the output signal increases. This results in successively decreasing increments in the output signal for equal increasing increments in the input rate. In other words, in the case of a meter readout, the high end of the scale is compressed because there is less needle indicator movement at the high end of the scale than there is at the low end of the scale for the same change in input rate. Conversely, if the feedback is such that an increasing output signal tends to increase the width of each generated pulse, the feedback is "positive" in the sense that the larger the output signal the greater the effect it has in increasing its own magnitude; the low end of the scale is compressed rather than the high end.

Further objects, features and advantages of my invention will become apparent upon a consideration of the following detailed description in conjunction with the drawing, in which:

FIG. 1 depicts a first illustrative embodiment of the invention;

FIG. 2 depicts a nonlinear scale which may be used in conjunction with the circuit of FIG. 1;

FIG. 3 illustrates an additional element which may be inserted between the points labeled 52, 54 in FIG. 1 to obtain low-scale compression rather than high-scale compression;

FIG. 4 illustrates various waveforms which will be helpful in understanding the invention; and FIG. 5 illustrates typical transfer characteristics which will further aid in understanding the invention.

Input pulses whose rate is to be determined are applied to input terminal 10 of the circuit of FIG. 1. These pulses are typically short in duration and can be derived by applying the repetitive input signal whose rate is of interest to a Schmitt trigger and then differentiating the output of the Schmitt trigger. The precise form and derivation of the input pulses applied to terminal 10 are not important insofar as the present invention is concerned. Transistors Q1 and Q2 comprise a monostable multivibrator with transistor Q2 normally on and transistor Q1 normally off. With transistor Q2 on, the collector of the transistor is shorted through the transistor to ground, and since the ground potential is applied through resistor 24 to the base of transistor Q1, the latter transistor remains off. The collector of transistor Q1, extended through resistors 14, 16 to positive potential source 26, is held at the potential of this source. The circuit can be best understood by considering that the connection of resistor 56 to the base of transistor Q2 is broken, and that the base of the transistor is connected only to capacitor 22 and resistor 18. With transistor Q2 conducting, the base-emitter voltage drop is approximately 0.5 volt, and since the emitter of the transistor is connected to ground the base of transistor Q2 is at a potential of 0.5 volt.

As soon as a positive input pulse is applied to terminal 10 transistor Q1 turns on. The collector of the transistor drops to approximately ground potential. The initial voltage across capacitor 22 (while the multivibrator is in its stable state) is the difference between the collector voltage of transistor Q1 (+B volts, where B is the magnitude of source 26) and the voltage at the base of transistor Q2 (0.5 volt). The voltage across a capacitor cannot change instantaneously, and when the collector of transistor Q1 drops to ground potential, the base of transistor Q2 drops to a negative potential equal to the original voltage drop across the capacitor. Thus, the base of transistor Q2 drops to a potential of −B+0.5 volts. This is shown in FIG. 4, where the various waveforms depict the potential at the base of transistor Q2 as a function of time for different cases to be considered below. With the application of an input pulse, the base potential drops from 0.5 volt to −B+0.5 volts.

Current flows from source 26 through resistor 18, capacitor 22 and transistor Q1 to ground. As the capacitor charges, the voltage at the base of transistor Q2 rises exponentially. This rise is shown by line segments 62, 62' in FIG. 4. The base potential rises toward a voltage level of +B. But as soon as the base potential reaches 0.5 volt, transistor Q2 turns on and transistor Q1 turns off. The base potential remains at 0.5 volt, and it is for this reason that the line segment 62' is shown dotted in FIG. 4; the base voltage does not actually reach the +B level, but remains at 0.5 volt. The multivibrator then remains in its stable state with transistor Q2 on and transistor Q1 off until the application of the next input pulse.

With transistor Q1 originally off, the junction of resistors 14, 16 is at the potential of source 26. Since the base of transistors Q3 is connected to this junction and the emitter of the transistor is connected to source 26, the emitter-base junction is not forward biased and transistor Q3 remains nonconducting. But while the base of transistor Q2 rises in potential as represented by line segment 62 in FIG. 4, the potential of the junction of resistors 14, 16 is decreased relative to the magnitude of source 26 since transistor Q1 is conducting. Thus, for the time interval indicated as $t$ in FIG. 4, the base of transistor Q3 is at a potential less than that of source 26 and transistor Q3 turns on. The transistor conducts for a fixed time interval $t$ following the receipt of each input pulse at terminal 10.

Transistor Q3 is included in the circuit primarily for the purpose of deriving a fixed-amplitude current pulse for each triggering of the multivibrator. The potential at the junction of resistors 14, 16 is not constant during the period $t$, and thus it is not suitable for directly generating fixed-amplitude current pulses. However, the potential at the junction, at all times during the period $t$, is low enough to saturate transistor Q3, and thus during the period $t$ a fixed-amplitude current pulse is generated at the collector of transistor Q3.

A first integrator including resistor 30 and capacitor 32 is connected across the collector of transistor Q3. Consider for the moment that capacitor 36 is extended to ground potential rather than to output terminal 50. In such a case, resistor 34 and capacitor 36 would comprise a second integrating stage, and resistor 38 and capacitor 40 would comprise a third integrating stage. Although transistor Q3 generates current pulses, the voltage at the base of transistor Q4 is smoothed by the three integrating stages, and its magnitude is proportional to the area and rate of the pulses generated by transistor Q3. Since all of the pulses have the same width and amplitude, the potential at the base of transistor Q3. Since all of the pulses have the same width and amplitude, the potential Q4 is proportional to the rate at which the pulses are generated. Resistor 28 provides a discharge path for the capacitors so that the integrating stages in effect derive a voltage signal which represents the average current through transistor Q3 over a number of cycles of operation.

Transistors Q4 and Q5 are complementary emitter followers. They are included in the circuit in order that a meter, connected to output terminal 50, does not load down the integrators. Although a single emitter follower stage could be used, in such a case the voltage across capacitor 40 would have to exceed the forward drop across the base-emitter junction of the transistor before the transistor could conduct. This would prevent any output signal from appearing at terminal 50 until the voltage across capacitor 40 exceeded 0.5 volt. With the use of complementary emitter followers, however, the voltage at terminal 50 follows even very small voltages across capacitor 40. Assuming that the emitter-base drop across each of transistors Q4 and Q5 is 0.5 volt, the voltage at the emitter of transistor Q4 is greater than the voltage across capacitor 40 by 0.5 volt. But since there is a drop of 0.5 volt across the emitter-base junction of transistor Q5, the emitter of transistor Q5 is at the same potential as the base of transistor Q5, the emitter of transistor Q5 is at the same potential as the base of transistor Q4. Since output terminal 50 is connected to the emitter of transistor Q5, the output terminal is at all times at a potential equal to the voltage across capacitor 40. Another advantage of the dual emitter follower configuration is that leakage current through the collector-base junction of transistor Q4 does not materially affect the voltage at output terminal 50. Because the emitter and collector of transistor Q4 are both at approximately the same potential, there is very little leakage current through transistor Q4.

Because capacitor 36 is connected to output terminal 50, rather than to ground, a certain amount of feedback is introduced into the integrator-emitter follower section of the circuit. Three resistor-capacitor (RC) circuits in series, as is known in the art, produce an amplitude-frequency characteristic having a slope of 18 db./octave. This, in turn, results in a relatively slow rise time for the response to a step a step input to the integrator. In a rate meter used to monitor the heartbeat rate of a cardiac patient, a fast response is desired, that is, the output voltage should change as soon as possible to reflect a change in the input rate. A faster rise time can be obtained by connecting capacitor 36 to the output terminal rather than to ground. Such a connection produces a "hump" at the high-frequency end of the amplitude-frequency characteristic of the system, which is accompanied by a faster step response.

The particular magnitudes of the resistors and capacitors in the integrating stage of the system can be selected in accordance with well-known principles. For heartbeat monitoring, it is preferable to select component values such that the damping factor is seven-tenths of the critical value, the critical value being the minimum damping factor which results in no overshoot for a step input. With a damping factor equal to seven-tenths of the critical value, there is only one overshoot for a step input. This results in a very fast response at output terminal 50 for a step change in input rate with an overshoot which is almost nonobservable. The cutoff frequency of the three RC stages preferably should be approximately 20 cycles per minute in the case of a cardiac rate meter.

The operation just described results in a linear output, that is, the magnitude of the potential at terminal 50 is directly proportional to the rate of the input pulses at terminal 10. The system may be made nonlinear with high-scale compression simply by connecting resistor 56 between output terminal 50 and the base of transistor Q2.

Assume for the moment that resistor 56 is connected to ground rather than to terminal 50. Without resistor 56 in the circuit, the time period during which transistor Q1 is on and transistor Q2 is off following the receipt of each input pulse at terminal 10 is determined by three factors. These factors are the magnitude of capacitor 22, the magnitude of resistor 18 and the magnitude of potential source 26. As shown by line segments 62, 62' in FIG. 4, the voltage at the base of transistor Q2 rises exponentially. The time constant of this rise is determined by the product of the magnitude of capacitor 22 and the magnitude of resistor 18, and the voltage rises toward a level of +B. But with resistor 56 connected between the base of transistor Q2 and ground, both the effective resistance in the RC circuit and the effective voltage level toward which the base of transistor Q2 rises are changed. Because resistor 56 is now in parallel with resistor 18, the effective resistance of the parallel combination is less than that of resistor 18 alone, and the overall time constant is reduced. At the same time, however, the effective voltage toward which the base of transistor Q2 rises is somewhere between ground and +B. Referring to FIG. 4 and to line segments 64, 64' it is seen that because of the reduced time constant the voltage at the base of transistor Q2 initially rises faster than it otherwise would in the absence of resistor 56. However, the voltage rises not toward a level of +B, but toward a lower level of +B', which level is determined by the ratio of the magnitudes of resistors 18 and 56. If the resistors are chosen such that line segments 62, 64 intersect after a time period $t$, the period of the pulser comprising transistors Q1, Q2 will not be affected by the addition of resistor 56 to the circuit between the base of transistor Q2 and ground. (It is also possible to adjust the value of capacitor 22 and to select an appropriate resistor 56 in order that the pulser generate the same width pulse with resistor 56 connected between the base of transistor Q2 and ground.)

Thus, with the addition of resistor 56 to the circuit, but connected between the base of transistor Q2 and ground, the overall circuit timing is not changed. However, because the resistor is returned to output terminal 50 rather than to ground in FIG. 1 the circuit operation is nonlinear.

With an input signal applied to terminal 10 and output terminal 50 at some positive potential, the voltage toward which the base of transistor Q2 rises is no longer a function of the magnitude of source 26 and the ground level, but instead is a function of the magnitude of the source and the magnitude of the output voltage. The effective level toward which the base voltage rises exponentially is somewhere between the two levels +B and +B'. This level is a function of frequency since the output voltage at terminal 50 is a function of the rate of the input signal. This is indicated in FIG. 4 by the level B(f).

The voltage at the base of transistor Q2 no longer rises toward level +B' as indicated by line segments 64, 64'. Instead, it rises toward the higher level B(f). The time constant is the same as that with resistor 56 returned to ground, but the level toward which the exponential waveform rises is greater. This is indicated by line segments 66, 66'. It is apparent that the base of transistor Q2 reaches 0.5 volt in a time period shorter than *t*. This reduces the width of each generated pulse, which in turn reduces the output voltage. Of course, as the rate of the input signal increases, the output voltage increases because there are more generated pulses in any given period of time. However, the output voltage does not increase as much as it otherwise would because the increasing output voltage itself reduces the width of each pulse. Moreover, this effect increases with increasing output voltage (input rate) because the larger the output voltage the shorter the width of each pulse. Consequently, the ratio of the incremental change in output voltage to the incremental change in input rate decreases with increasing rate. This results in high-scale compression. If output terminal 50 is connected to a meter having a scale such as that shown in FIG. 2, it is apparent that the higher up needle indicator 68 moves on the scale, the less it moves for an incremental increase in the input rate. It is thus apparent that a conventional type linear rate-measuring instrument (broadly having pulser and integrating sections) can be made nonlinear simply by feeding the output of the integrating section back to the pulser. Of course, if a conventional linear rate measuring instrument with a meter scale readout is modified in accordance with the principles of my invention, the meter sensitivity must be adjusted (typically by turning a screw provided for that purpose). Since the output voltage at terminal 50 for any nonzero rate is less than it otherwise would be in the absence of the "negative" feedback introduced by resistor 56, the maximum output voltage (for the maximum input rate) is not sufficient to provide a full-scale scale deflection on a meter used with an instrument not having the feedback. To obtain a full-scale deflection, the meter sensitivity should be increased.

Referring to the nonlinear scale of FIG. 2, which can be used with the high-scale compression circuit of FIG. 1, it should be noted that the rate range of considerable interest, 40–100 beats per minute, comprises 25 percent of the full scale. Without the high scale compression, and with the same total range of 0–300 beats per minute, the range 40–100 beats per minute would comprise only 20 percent of a linear scale.

In the circuit of FIG. 1, the compression takes place at the upper end of the scale. It is also possible to compress the lower end of the scale. This can be accomplished by placing an amplifier 60 having a gain of −1 between terminals 52, 54 in FIG. 1. Such an amplifier 60 is shown in FIG. 3. Resistor 56 in such a case is grounded when no input signal is applied to terminal 10, but is returned to the negative output potential of the amplifier when a signal is applied to terminal 10, the magnitude of the negative potential increasing with an increasing input rate. The effective level toward which the voltage at the base of transistor Q2 rises is thus somewhere between +B' and the negative output voltage of amplifier 60. Referring to FIG. 4, the level B(f) thus moves below the level +B', and its maximum value is +B' (with no input signal). Since the lower the effective level toward which the voltage at the base of transistor Q2 rises exponentially, the longer the pulser period, it is apparent that the pulse width increases with an increasing input rate. Thus, the ratio of the incremental change in output voltage to the incremental change in input rate increases with increasing input rate. This means that the greatest meter resolution is obtained at the upper end of the scale rather than the lower end of the scale.

In either case, whether the ratio of the incremental change in output voltage to the incremental change in input rate decreases ("negative" feedback) or increases ("positive" feedback), the transfer function of the system has a slope which changes continuously in the same direction. FIG. 5 shows the various transfer characteristics of the circuit of FIG. 1, that is, plots of the output voltage ($E_o$) on terminal 50 as a function of input rate (*f*). Without resistor 56, the circuit has a linear transfer function 70. With the resistor and "negative" feedback, the circuit has a nonlinear, high-scale compression transfer function 72 whose slope decreases continuously with increasing rate. With the resistor and "positive" feedback, the circuit has a nonlinear, low-scale compression transfer function 74 whose slope increases continuously with increasing rate.

Although the invention has been described with reference to particular embodiments, it is to be understood that these embodiments are merely illustrative of the application of the principles of the invention. For example, high rates can be measured by having the pulser operate responsive to every other input signal, or in general having the pulser operate at a rate which is simply a fraction of the input rate. It is also possible to use the feedback signal to vary some factor other than an effective voltage level, e.g., the magnitude of resistor 18 for the purpose of varying the pulse width, or the amplitude of the current pulses to vary the average value of the current through transistor Q3 to effect the output voltage by adjusting the pulse amplitude rather than the pulse width. Thus, it is to be understood that numerous modifications may be made in the illustrative embodiments of the invention and other arrangements may be devised without departing from the spirit and scope of the invention.

What is claimed is:

1. A nonlinear rate-measuring instrument comprising means for generating fixed-amplitude pulses at a rate proportional to the rate of a repetitive series of waveforms, means for deriving an output signal which is proportional to both the rate at which said pulses are generated and the width of the generated pulses, and means for adjusting the width of the generated pulses in accordance with the magnitude of said output signal.

2. A nonlinear rate-measuring instrument in accordance with claim 1 wherein said adjusting means decreases the width of said generated pulses with an increasing output signal.

3. A nonlinear rate-measuring instrument in accordance with claim 1 wherein said adjusting means increases the width of said generated pulses with a decreasing output signal.

4. A nonlinear rate-measuring instrument in accordance with claim 1 wherein said output signal deriving means is operative to derive said output signal as a function of both the average rate and the average width of said generated pulses.

5. A nonlinear rate-measuring instrument in accordance with claim 4 wherein said adjusting means is operative to control said output signal as a function of the generated pulse rate to have a slope which changes continuously in the same direction with increasing generated pulse rate.

6. A nonlinear rate-measuring instrument in accordance with claim 1 wherein said generating means includes a resistor-capacitor charging circuit having a capacitor, a source of fixed potential, first impedance means connecting one end of said capacitor to said source of fixed potential, second impedance means connected at one end thereof to said one end of said capacitor, means for applying to the other end of said second impedance means a potential which is a function of said output signal, and means for controlling the width of each generated pulse to equal the time required for said capacitor to charge between a first level and a second level from said source of fixed potential and the potential applied to said other end of said second impedance means.

7. A nonlinear rate-measuring instrument in accordance with claim 6 wherein the potential applied to said other end of said second impedance means is said output signal.

8. A nonlinear rate-measuring instrument in accordance with claim 6 wherein said potential applying means includes an amplifier having a negative gain, an input coupled to said output signal and an output coupled to said other end of said second impedance means.

9. A nonlinear rate-measuring instrument comprising means for generating a signal containing pulses at a rate proportional to the rate of a repetitive series of waveforms in an input signal, means for deriving an output signal which is proportional to the average area of said generated signal, and means for adjusting the area of the generated pulses in accordance with the magnitude of said output signal.

10. A nonlinear rate-measuring instrument in accordance with claim 9 wherein said adjusting means decreases the width of said generated pulses with an increasing output signal.

11. A nonlinear rate-measuring instrument in accordance with claim 9 wherein said adjusting means increases the width of said generated pulses with a decreasing output signal.

12. A nonlinear rate-measuring instrument in accordance with claim 9 wherein said output signal deriving means is operative to derive said output signal as a function of only the average rate and the average area of said generated pulses.

13. A nonlinear rate-measuring instrument in accordance with claim 12 wherein said adjusting means is operative to control said output signal as a function of the generated pulse rate to have a slope which changes continuously in the same direction with increasing generated pulse rate.

14. A nonlinear rate-measuring instrument in accordance with claim 9 wherein said generating means includes a resistor-capacitor charging circuit having a capacitor, a source of fixed potential, first impedance means connecting one end of said capacitor to said source of fixed potential, second impedance means connected at one end thereof to said one end of said capacitor, means for applying to the other end of said second impedance means a potential which is a function of said output signal, and means for controlling the area of each generated pulse to be directly proportional to the time required for said capacitor to charge between a first level and a second level from said source of fixed potential and the potential applied to said other end of said second impedance means.

15. A nonlinear rate-measuring instrument in accordance with claim 14 wherein the potential applied to said other end of said second impedance means is said output signal.

16. A nonlinear rate-measuring instrument in accordance with claim 14 wherein said potential applying means includes an amplifier having a negative gain, an input coupled to said output signal and an output coupled to said other end of said second impedance means.

17. A nonlinear rate-measuring instrument in accordance with claim 1, wherein said adjusting means increases the width of said generated pulses with an increasing output signal and wherein said adjusting means decreases the width of said generated pulses with a decreasing output signal.

18. A nonlinear rate-measuring instrument in accordance with claim 9, wherein said adjusting means increases the width of said generated pulses with an increasing output signal and wherein said adjusting means decreases the width of said generated pulses with a decreasing output signal.

\* \* \* \* \*